(12) United States Patent
Narita

(10) Patent No.: US 11,299,557 B2
(45) Date of Patent: Apr. 12, 2022

(54) METHOD FOR PRODUCING WATER-SOLUBLE NONIONIC CELLULOSE ETHER POWDER HAVING HIGH BULK DENSITY

(71) Applicant: SHIN-ETSU CHEMICAL CO., LTD., Tokyo (JP)

(72) Inventor: Mitsuo Narita, Joetsu (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 0 days.

(21) Appl. No.: 15/472,950

(22) Filed: Mar. 29, 2017

(65) Prior Publication Data

US 2017/0283513 A1    Oct. 5, 2017

(30) Foreign Application Priority Data

Apr. 4, 2016   (JP) .............................. JP2016-075347

(51) Int. Cl.
| C08B 11/20 | (2006.01) |
| C08B 11/08 | (2006.01) |
| C08B 11/193 | (2006.01) |
| C08B 11/02 | (2006.01) |

(52) U.S. Cl.
CPC .............. *C08B 11/20* (2013.01); *C08B 11/02* (2013.01); *C08B 11/08* (2013.01); *C08B 11/193* (2013.01)

(58) Field of Classification Search
CPC ................................ C08B 11/02; C08B 11/20
USPC .................. 536/84, 85, 95, 96, 99, 100, 124
See application file for complete search history.

(56) References Cited

U.S. PATENT DOCUMENTS

| 2,331,864 A | 10/1943 | Swinehart et al. |
| 5,488,104 A | 1/1996 | Schultz |
| 2001/0034441 A1 | 10/2001 | Schlesiger et al. |

FOREIGN PATENT DOCUMENTS

| CN | 1198926 A | 11/1998 |
| CN | 1311258 | 9/2001 |
| CN | 102276733 | 12/2011 |
| CN | 103459429 | 12/2013 |
| EP | 2567984 A1 | 3/2013 |
| EP | 2829553 A1 | 1/2015 |
| GB | 737363 A | 9/1955 |
| GB | 864144 A * | 3/1961 |
| GB | 2262527 A | 6/1993 |
| GN | 104250305 A | 12/2014 |
| WO | 02087643 | 7/2002 |
| WO | 2012015534 A1 | 2/2012 |

OTHER PUBLICATIONS

Extended European Search Report dated Aug. 16, 2017 in European Patent Application No. 17164359.6 (Shin-Etsu Chemical Co., Ltd.), including Annexes (6 pages).
Redacted Letter Summarizing in English the Second Office Action, dated Aug. 3, 2021, 4 pages.

* cited by examiner

*Primary Examiner* — Shaojia A Jiang
*Assistant Examiner* — Everett White
(74) *Attorney, Agent, or Firm* — F. Michael Sajovec; Williams Mullen

(57) ABSTRACT

Provided is a method of stably producing a water-soluble nonionic cellulose ether powder having a high bulk density at low cost by adding a minimum amount of water. More specifically provided is a method for producing a water-soluble nonionic cellulose ether powder, comprising the steps of: reacting alkali cellulose with an etherifying agent to obtain a reaction product; washing and draining the reaction product to obtain a water-soluble nonionic cellulose ether; mixing the water-soluble nonionic cellulose ether with such an amount of water of 70° C. or higher as to make a water content of the water-soluble nonionic cellulose ether become 55 to 90% by weight to obtain a water-containing water-soluble nonionic cellulose ether having a water content of 55 to 90% by weight; cooling the water-containing water-soluble nonionic cellulose ether; and drying and pulverizing the cooled water-containing water-soluble nonionic cellulose ether.

4 Claims, 1 Drawing Sheet

METHOD FOR PRODUCING WATER-SOLUBLE NONIONIC CELLULOSE ETHER POWDER HAVING HIGH BULK DENSITY

CROSS-REFERENCE TO RELATED APPLICATION

This application claims priority to Japanese Patent Application No. 2016-075347 filed Apr. 4, 2016; the entire disclosure of the application is incorporated herein by reference.

BACKGROUND OF THE INVENTION

1. Field of the Invention

The invention relates to a method for producing a water-soluble nonionic cellulose ether powder having a high bulk density used in the fields of construction materials, chemicals, pharmaceuticals, foods and others.

2. Description of the Related Art

Conventionally, a water-soluble nonionic cellulose ether has been used for pharmaceuticals, binders for foods, disintegrators, thickeners for various solvents, water retention agents for construction materials, binders for extrusion molding, suspension stabilizers and others.

The water-soluble nonionic cellulose ether is typically provided in a powder form. The water-soluble nonionic cellulose ether in a powder form preferably has a high bulk density because a powder having a higher bulk density reduces a space required for transportation or storage. In addition, the higher the bulk density becomes, the higher the powder flowability becomes. A powder having a high flowability is unlikely cause troubles such as bridging when the powder is fed from a hopper, for example.

The method of producing a water-soluble nonionic cellulose ether having a high bulk density includes the following examples. In a method, a wet cellulose ether is mixed with added water to obtain a cellulose ether feed composition having a water content of 50 to 80% by weight, and the composition is milled in a high speed rotation impact mill with heat (JP 2001-240601A). In another method, a cellulose ether is dispersed in hot water of 70° C. or higher to obtain a dispersion, the dispersion is pressed or filtered, while keeping the dispersion temperature above 50° C., to obtain a water-containing cellulose ether having a water content of 72 to 88% by weight, and the water-containing cellulose ether is cooled to 50° C. or lower (U.S. Pat. No. 2,331,864). In a method for producing a polysaccharide derivative used for a pharmaceutical sustained-release preparation, a polysaccharide derivative is brought into contact with water of 0 to 75° C. to obtain a composition having a weight ratio of the water to the polysaccharide derivative of 0.4 to 50, and the composition is simultaneously dried and pulverized (WO 2012015534). In another method, a water-soluble cellulose derivative having a water content of 35 to 90% by weight is prepared by addition of water of 50° C. or higher, and fed to a drying and pulverizing device, while maintaining a temperature of the water-soluble cellulose derivative at 50° C. or higher (WO 2012138531). In still another method, a cellulose compound having a water content of 30 to 80% and a temperature of 40 to 120° C. is cooled to −10 to 100° C. and then dried and pulverized (British Patent No. 2262527). When cold water is added to a cellulose ether, a lumpy mixture is formed due to incomplete wetting of the inside particles. In a method for solving the uneven wetting, a water-containing cellulose ether is extruded through a large number of orifices, each having a cross-sectional area of $7.5 \times 10^{-9}$ to $1 \times 10^{-8}$ m$^2$ (JP 10-502397T, which is the Japanese phase publication of WO 96/00748).

SUMMARY OF THE INVENTION

The method disclosed in JP 2001-240601A may have the following problems. When the wet cellulose ether is mixed with the added water, only the surface of the lumpy cellulose ether is dissolved to form a highly viscous gel-like film on the surface, so that the water fails to reach the inside of the lump, thereby causing uneven water distribution. As a result, an undissolved portion may be left as a fibrous cellulose ether, and lower a bulk density. In addition to the problem of an inferior bulk density, there is a problem of the consumption of excess energy in a later drying step as a result of the addition of an excess amount of water for eliminating the unevenness of water distribution. In the method disclosed in U.S. Pat. No. 2,331,864, a cellulose ether is added to a large amount of hot water and then the water content is adjusted to an intended value. Thus, the pressing or filtration amount is required to be controlled. The pressing or filtration amount is typically controlled by a pressure difference between before and after caking (for example, the degree of vacuum) as well as a pressing or filtration time. However, the pressing resistance of a cake or the filtration resistance of a filter is not constant owing to, for example, a short path through cracks generated in a cake, a variation in particle size of the cellulose ether, a variation in density of a cake caused by a substitution degree or polymerization degree of the cellulose ether, partial dissolution of the cellulose ether, and a variation in clogging degree of a filter. The pressing or filtration amount is thus difficult to control, and an intended water content may not be achieved, resulting in a low bulk density. In the method disclosed in WO 2012015534, the temperature of the water with which the polysaccharide derivative is brought into contact is in the range of 0 to 75° C. At a relatively low temperature in the range (for example, 40° C. or lower), especially at 0 to 10° C. shown in examples, there may be the same problems as in JP 2001-240601A. At a relatively high temperature (for example, higher than 70° C.), the cellulose ether is unlikely to be dissolved so that an undissolved portion may be left as a fibrous cellulose ether, and the water-soluble nonionic cellulose ether having a high bulk density may not be produced. Also in the methods disclosed in WO 2012138531 and British Patent No. 2262527, a cellulose ether is unlikely to be dissolved so that an undissolved portion may be left as a fibrous cellulose ether, and the water-soluble nonionic cellulose ether having a high bulk density may not be produced. In the method disclosed in JP 10-502397T, a strong extrusion pressure may deform or break a large number of orifices. When the extrusion is interrupted, the cellulose ether may be dried and solidified on the orifice surfaces or in the orifices to cause clogging, so that the extrusion may not be restarted. Thus, the results are industrially unsatisfactory.

In view of the above circumstances, an object of the present invention is to provide a method for stably producing a water-soluble nonionic cellulose ether powder having a high bulk density at low cost by adding a minimum amount of water.

As a result of intensive studies for achieving the object, the inventors have found that addition of a minimum amount of water results in accurate adjustment of the water content so that a water-soluble nonionic cellulose ether powder having a high bulk density can be stably produced without the consumption of excess energy in a later drying step, and have completed the invention.

According to the invention, there can be provided a method for producing a water-soluble nonionic cellulose ether powder, comprising the steps of: reacting alkali cellulose with an etherifying agent to obtain a reaction product; washing and draining the reaction product to obtain a water-soluble nonionic cellulose ether; mixing the water-soluble nonionic cellulose ether with such an amount of water of 70° C. or higher as to make a water content of the water-soluble nonionic cellulose ether become 55 to 90% by weight to obtain a water-containing water-soluble nonionic cellulose ether having a water content of 55 to 90% by weight; cooling the water-containing water-soluble nonionic cellulose ether; and drying and pulverizing the cooled water-containing water-soluble nonionic cellulose ether.

According to the invention, addition of water of 70° C. or higher in such a minimum amount as to make a water content of a water-soluble nonionic cellulose ether become 55 to 90% by weight allows a water-soluble nonionic cellulose ether powder having a high bulk density to be stably produced, and also allows the energy consumption in a drying step to be reduced.

DETAILED DESCRIPTION OF THE PREFERRED EMBODIMENTS

Figure 1:
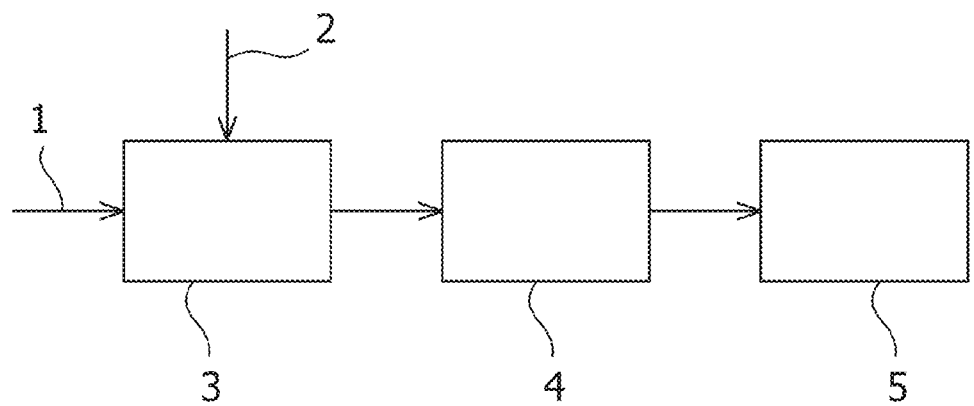
FIG. 1 shows an embodiment in which the step of mixing with water of 70° C. or higher and the step of cooling are carried out in respective devices.

Examples of the water-soluble nonionic cellulose ether powder include an alkyl cellulose, a hydroxyalkyl cellulose and a hydroxyalkyl alkyl cellulose. Examples of the alkyl cellulose include methyl cellulose having a degree of substitution (DS) of 1.0 to 2.2 and ethyl cellulose having a DS of 2.0 to 2.6. Examples of the hydroxyalkyl cellulose include hydroxyethyl cellulose having a molar substitution (MS) of 0.05 to 3.0 and hydroxypropyl cellulose having an MS of 0.05 to 3.3. Examples of the hydroxyalkyl alkyl cellulose include hydroxyethyl methyl cellulose having a DS of 1.0 to 2.2 and an MS of 0.1 to 0.6, hydroxypropyl methyl cellulose having a DS of 1.0 to 2.2 and an MS of 0.1 to 0.6, and hydroxyethyl ethyl cellulose having a DS of 1.0 to 2.2 and an MS of 0.1 to 0.6. The DS represents a degree of substitution and is the number of alkoxy groups per glucose ring unit of a cellulose. The MS represents a molar substitution and is the average molar number of hydroxy alkoxy groups added to a glucose ring unit of a cellulose. The DS and the MS can be calculated from values determined in accordance with the Japanese Pharmacopoeia Sixteenth Edition.

A crude cellulose ether of the water-soluble nonionic cellulose ether powder can be prepared as the reaction product in an etherification step of reacting alkali cellulose with an etherifying agent. The alkali cellulose can be prepared by bringing a pulp such as wood pulp or linter pulp into contact with a solution of an alkali metal hydroxide such as sodium hydroxide.

An alkali metal hydroxide solution and an etherifying agent may be used together so that the produced alkali cellulose can be immediately reacted with the etherifying agent. Alternatively, alkali cellulose may be produced and then reacted with an etherifying agent. Examples of the etherifying agent include an alkyl halide such as methyl chloride, and an alkylene oxide such as ethylene oxide and propylene oxide.

The crude cellulose ether is subjected to a washing and draining step to obtain a purified water-soluble nonionic cellulose ether. In the washing and draining step, the washing and the draining may be carried out separately or simultaneously. For example, filtration or pressing may be carried out after washing, or filtration or pressing may be carried out while pouring washing water.

The washing and draining can be carried out by using a known method. For example, a crude cellulose ether is subjected to addition of preferably water, more preferably hot water of preferably 85 to 100° C. to obtain a slurry containing the water-soluble nonionic cellulose ether preferably at a concentration of 1 to 15% by weight, and the slurry is drained and optionally pressed.

As the device for draining, for example, a vacuum filtration device, a pressure filtration device, a centrifugal dehydrator, a filter press, a screw press, or a V-type disk press can be selected. As the device for pressing, substantially the same device as that for draining can be used. The drained product may be optionally subjected to passing of hot water for further washing. Alternatively, a filtered or pressed product can be optionally made into a slurry again for further draining or pressing.

When the water-soluble nonionic cellulose ether is mixed with water of 70° C. or higher, the water-soluble nonionic cellulose ether just before being mixed with the water of 70° C. or higher preferably has a water content of 30 to 60% by weight, more preferably 40 to 55% by weight, from the standpoint of energy consumption in the step of draining or remaining impurities. The water content can be determined in accordance with "Loss on Drying Test" in the Japanese Pharmacopoeia Sixteenth Edition.

When the water-soluble nonionic cellulose ether is mixed with the water of 70° C. or higher, the water-soluble nonionic cellulose ether just before being mixed with the water of 70° C. or higher preferably has a temperature of 50° C. to 120° C., more preferably 70° C. to 100° C. from the standpoint of water distribution or avoidance of excess cooling energy consumption in the subsequent cooling step.

The temperature of the water to be mixed with the water-soluble nonionic cellulose ether is 70° C. or higher, preferably 70° C. to 120° C., more preferably 80° C. to 100° C. When the temperature is less than 70° C., only the surface of the lumpy water-soluble nonionic cellulose ether is dissolved to form a highly viscous gel-like film on the surface. Thus, the water fails to reach the inside of the lumps so that water distribution becomes uneven. As a result, an undissolved portion is left as a fibrous water-soluble nonionic cellulose ether, resulting in an inferior bulk density. When the temperature is higher than 120° C., excess cooling energy may be consumed in the subsequent cooling step.

The water-soluble nonionic cellulose ether is mixed with the water of 70° C. or higher to obtain a water-containing water-soluble nonionic cellulose ether. For example, the water of 70° C. or higher is added to the water-soluble nonionic cellulose ether with stirring in a mixer with a stirrer so that the obtained water-containing water-soluble nonionic cellulose ether will have a water content of preferably 55 to 90% by weight, more preferably 60 to 80% by weight. When the water content is less than 55% by weight, the water-soluble nonionic cellulose ether powder having a high bulk density will not be able to be produced. When the water content is more than 90% by weight, excess energy will be consumed in the later drying step.

The temperature of the water-containing water-soluble nonionic cellulose ether is preferably 50° C. to 120° C., more preferably 70° C. to 90° C. from the standpoint of water distribution or avoidance of excess cooling energy consumption in the subsequent cooling step.

The water content of the obtained water-containing water-soluble nonionic cellulose ether is preferably 5% by weight or more, more preferably 10% by weight or more, even more preferably 15% by weight or more, higher than the water content of the water-soluble cellulose ether just before being mixed with the water of 70° C. or higher from the standpoint of obtaining a water-soluble nonionic cellulose ether powder having a high bulk density. The upper limit of the higher water content (i.e. water content increase) of the water-containing water-soluble nonionic cellulose ether is preferably 40% by weight from the standpoint of avoidance of excess energy consumption in the later drying step.

It is preferred that the water-soluble nonionic cellulose ether and the water of 70° C. or higher be simultaneously contacted each other and stirred in a mixer with a stirrer. In other words, it is preferred that an amount of water required to provide a substantially exact water content in the preferable range after the mixing be used relative to the amount of the water-soluble nonionic cellulose ether, and simultaneous contact between the water and the water-soluble nonionic cellulose ether take place. This is because when a large amount of one of the water-soluble nonionic cellulose ether and the water is present in a mixer with a stirrer and then the other is fed into the mixer at a certain rate, a portion having first come into contact has an excess or insufficient water content so that water distribution may become uneven. When the water-soluble nonionic cellulose ether is fed to a mixer with a stirrer through a conveyance device capable of stirring, such as a screw conveyor, the conveyance device is also regarded as a part of the mixer with a stirrer so that the water of 70° C. or higher may be added to the conveyance device.

The water of 70° C. or higher to be mixed with the water-soluble nonionic cellulose ether is preferably continuously fed into the mixer with a stirrer because the water-soluble nonionic cellulose ether and the water are likely to come to simultaneous contact each other in the mixer with a stirrer.

The method of continuously feeding the water is preferably exemplified by dropwise addition of the water or spraying of the water to the inlet or the inside of the mixer with a stirrer. The dropwise addition or the spraying can be carried out at a single position or two or more positions.

The residence time in the mixer of the water-soluble nonionic cellulose ether mixed with the water of 70° C. or higher is preferably 1 second to 60 minutes, more preferably 1 to 30 minutes, even more preferably 1 to 15 minutes from the standpoint of water distribution.

As the mixer with a stirrer, a known device can be used. Examples include a ribbon mixer, a screw mixer, a rotor mixer with pins, a paddle mixer, a mixer with paddles, a Proshear mixer, a twin-screw kneader, a co-kneader, a votator kneader, a self-cleaning kneader, and a biaxial kneader.

The stirring rate is preferably 0.05 to 50 m/s, more preferably 0.1 to 20 m/s, even more preferably 0.1 to 10 m/s in terms of the peripheral speed of a stirring propeller from the standpoint of water distribution or power consumption for stirring.

The mixer with a stirrer is preferably of a continuous type rather than of a batch type because the water-soluble nonionic cellulose ether and the water of 70° C. or higher are likely to simultaneously come to contact each other in the mixer.

The mixer with a stirrer is preferably kept warm or heated with an appropriate technique. For example, the surface of the mixer is preferably covered with a heat-insulating material, or the mixer with a jacket is preferably used wherein the jacket temperature is preferably maintained at 70° C. or higher. It is because such a mixer can prevent the dissolution due to temperature drop from starting before the added water is evenly distributed in the water-soluble nonionic cellulose ether.

Next, the obtained water-containing water-soluble nonionic cellulose ether is cooled. The cooled water-containing water-soluble nonionic cellulose ether has a temperature of preferably 0 to 40° C., more preferably 1 to 30° C., from the standpoint of cooling energy or obtaining a water-soluble nonionic cellulose ether powder having a high bulk density.

As the cooling method, a known cooling technique can be used. For example, a method of bringing the water-containing water-soluble nonionic cellulose ether into contact with a cooled heat transfer surface, a method of bringing the water-containing water-soluble nonionic cellulose ether into contact with cold air, or a method of using vaporization heat can be used.

When the water-containing water-soluble nonionic cellulose ether is cooled by the method of bringing the cellulose ether into contact with a cooled heat transfer surface, a cooling device with a jacket is preferably used. The jacket temperature is preferably maintained at 40° C. or lower, more preferably at −40° C. to 30° C. When the temperature is higher than 40° C., the water-soluble nonionic cellulose ether powder having a high bulk density may not be produced.

The residence time in a cooling device of the water-containing water-soluble nonionic cellulose ether is preferably 10 seconds to 60 minutes, more preferably 1 minute to 30 minutes, even more preferably 1 to 15 minutes, from the standpoint of obtaining a water-soluble nonionic cellulose ether powder having a high bulk density.

The cooling may be stationary cooling or cooling with stirring. The cooling with stirring is preferred from the standpoint of more efficient cooling.

The stirring rate for cooling is preferably 0.05 to 50 m/s, more preferably 0.1 to 20 m/s, even more preferably 0.1 to 10 m/s in terms of the peripheral speed of a stirring propeller from the standpoint of the power consumption for stirring or the water evaporation of the water-containing water-soluble nonionic cellulose ether.

As the cooling device with a stirrer, a known device can be used. Examples include a ribbon mixer, a screw mixer, a rotor mixer with pins, a paddle mixer, a mixer with paddles, a Proshear mixer, a twin-screw kneader, a co-kneader, a votator kneader, a self-cleaning kneader, and a biaxial kneader.

The cooling device is preferably of a continuous type rather than of a batch type because the cooling device of the continuous type can have a smaller size.

The step of mixing the water-soluble nonionic cellulose ether with the water of 70° C. or higher to obtain a water-containing water-soluble nonionic cellulose ether and the step of cooling the obtained water-containing water-soluble nonionic cellulose ether can be carried out in respective devices or in the single device. When the steps are carried out in the single device, for example, the device is divided into two or more zones comprising a zone for adding the water of 70° C. or higher and stirring and a zone for cooling. The zone for cooling is provided after the zone for adding the water of 70° C. or higher and stirring. In the zone for adding the water of 70° C. or higher and stirring, there is preferably provided a means for keeping warm or a heater. In the zone for cooling, there is provided a means for the cooling.

Figure 2:
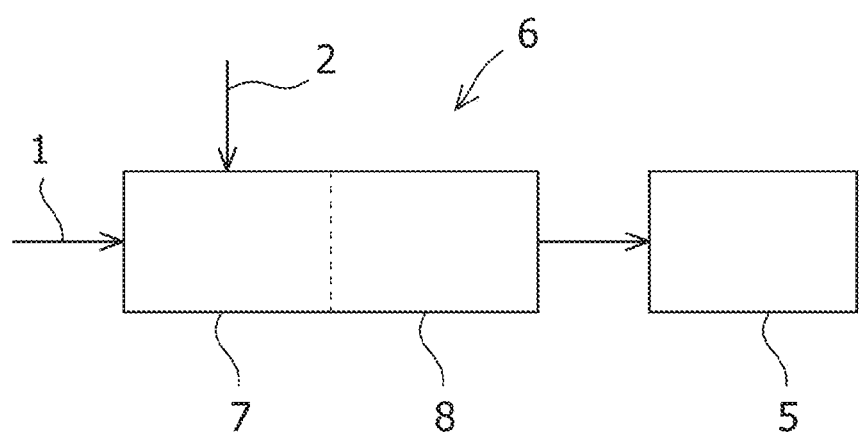
FIG. 2 shows an embodiment in which the step of mixing with water of 70° C. or higher and the step of cooling are carried out in the single device.

FIG. 1 shows an embodiment in which the step of mixing the water-soluble nonionic cellulose ether with the water of 70° C. or higher and the step of cooling the obtained water-containing water-soluble nonionic cellulose ether are carried out in respective devices. FIG. 2 shows an embodiment in which the step of mixing and the step of cooling are carried out in the single device. In FIG. 1, the water-soluble nonionic cellulose ether 1 and the water 2 of 70° C. or higher are introduced into a mixer 3 with a stirrer and mixed with stirring, then the resulting mixture is cooled in a cooling device 4, and the cooled mixture is treated in a dryer, a pulverizer, or a drying and pulverizing device 5 in which drying and pulverizing is simultaneously carried out. In FIG. 2, the water-soluble nonionic cellulose ether 1 and the water 2 of 70° C. or higher are introduced into a mixing-with-stirring zone 7 of a mixer 6 with a stirrer containing a cooling zone, then the resulting mixture is cooled in the cooling zone 8 of the mixer 6, and the cooled mixture is treated in a dryer, a pulverizer, or a drying and pulverizing device 5 in which drying and pulverizing is simultaneously carried out.

Next, the cooled water-containing water-soluble nonionic cellulose ether is subjected to the step of drying and pulverizing by a known method to obtain a water-soluble nonionic cellulose ether powder. In the step of drying and pulverizing, the drying and the pulverizing may be carried out separately or simultaneously. For example, the cooled cellulose ether can be dried and then pulverized, or can be simultaneously dried and pulverized.

Examples of the dryer may include a stirring dryer such as a paddle drier; a fluidized bed dryer; and a hand dryer.

Examples of the pulverizer may include a ball mill, a vibration mill, an impact grinder, a roller mill, and a jet mill.

The method of simultaneous drying and pulverizing is exemplified by a method of introducing a heated gas into an impact pulverizer together with the cooled water-containing water-soluble nonionic cellulose ether.

The dried and pulverized water-soluble nonionic cellulose ether is optionally subjected to sieving and mixing to obtain a water-soluble nonionic cellulose ether powder.

The water-soluble nonionic cellulose ether powder has an average particle size of preferably 30 to 300 μm, more preferably 40 to 200 μm, even more preferably 50 to 100 μm from the standpoint of flowability or dissolution rate. The average particle size can be determined by the dry mechanical sieving method in "Test methods for sieving of chemical products" in accordance with JIS K0069.

Regarding the bulk density, the water-soluble nonionic cellulose ether powder has a loose bulk density of preferably 0.20 to 0.60 g/ml, more preferably 0.25 to 0.50 g/ml, even more preferably 0.30 to 0.47 g/ml from the standpoint of flowability or dissolution rate. The "loose bulk density" is a bulk density in a loosely packed state and can be determined by the method comprising the steps of: evenly placing a sample sieved through a JIS 22-mesh sieve (a mesh size of 710 μm) in a stainless steel cylindrical container having a diameter of 5.03 cm and a height of 5.03 cm (a capacity of 100 ml) from 23 cm above a top surface of the container; and then leveling off the top surface for weighing.

A 2% by weight aqueous solution of the water-soluble nonionic cellulose ether powder has a viscosity at 20° C. of preferably 2 to 600,000 mPa·s, more preferably 5 to 300,000 mPa·s from the standpoint of obtaining an intended viscosity. The viscosity at 20° C. of the 2% by weight aqueous solution of the water-soluble nonionic cellulose ether can be determined in accordance with Method II of viscosity measurement of hypromellose in the Japanese Pharmacopoeia Sixteenth Edition, by using a single cylinder-type rotational viscometer (Brookfield type viscometer) type LV.

According to the invention, the water-soluble nonionic cellulose ether powder has a high bulk density so that the space required for transportation or storage is reduced. The water-soluble nonionic cellulose ether powder has excellent powder flowability so that it is unlikely to cause troubles such as bridging when the powder is fed, for example, from a hopper. In addition, when the powder is fed, for example, from a hopper, the water-soluble nonionic cellulose ether powder is excellent in quantitativeness during feeding of an exact amount of the powder and excellent in the feeding rate. For these reasons, the water-soluble nonionic cellulose ether powder can be used for pharmaceuticals, binders for foods, disintegrators, thickeners for various solvents, water retention agents for construction materials, and binders for extrusion molding.

EXAMPLES

The invention will next be described specifically with reference to Examples and Comparative Examples. It should not be construed that the invention is limited to or by Examples.

A continuous type Proshear mixer with a spray nozzle was used as the mixer with a stirrer, and a continuous type Proshear mixer with a jacket was used as the cooling device.
<Water Content>
The water content was determined in accordance with the measurement method of the loss on drying of hypromellose in the Japanese Pharmacopoeia Sixteenth Edition.
<Substitution Degree>
The substitution degree was determined in accordance with the measurement method of the substitution degree of hypromellose in the Japanese Pharmacopoeia Sixteenth Edition.
<Average Particle Size>
The dry mechanical sieving method in Test methods for sieving of chemical products of JIS K0069 was used.
JIS standard sieves having mesh sizes of 250 μm, 180 μm, 150 μm, 106 μm, 75 μm, 63 μm, 45 μm and 38 μm were arranged in this mesh size order from the top, and a receiver was placed below the sieves. As the shaker, a GRADEX, type G200-NF1 (manufactured by ROTEX) was used.

On the 250-μm sieve, 50 g of a sample was placed and classified with the sieve shaker for 20 minutes. The weights of the particles left on the respective sieves and the receiver were determined, and the weight ratios (%) of the particles on the respective sieves were calculated. The weight ratios of particles were accumulated successively from that on the receiver to those on sieves in the ascending order of mesh size, and the particle size at which the accumulated value reached 50% was regarded as the average particle size.
<Loose Bulk Density>
The "loose bulk density" is a bulk density in a loosely packed state and was determined by the following method.

A sample was sieved through a JIS 22-mesh sieve (a mesh size of 710 μm) and evenly placed in a cylindrical container (made of stainless steel) having a diameter of 5.03 cm and a height of 5.03 cm (a capacity of 100 ml) from 23 cm above a top surface of the container; and then the top surface was leveled off for weighing.

<Viscosity at 20° C. of 2% by Weight Aqueous Solution>

The viscosity at 20° C. of a 2% by weight aqueous solution was determined in accordance with Method II of viscosity measurement of hypromellose in the Japanese Pharmacopoeia Sixteenth Edition, by using a single cylinder-type rotational viscometer (Brookfield type viscometer) type LV.

Example 1

In a pressure container with an internal stirrer, 1.43 parts by weight of a 49% by weight aqueous sodium hydroxide solution was added to 1.00 part by weight of pulp powder to obtain alkali cellulose. The 0.97 part by weight of methyl chloride for methoxy group substitution and 0.24 part by weight of propylene oxide for hydroxypropoxy group substitution were added to the alkali cellulose, and reacted at a temperature of 60° C. to 90° C. for 2 hours to obtain a reaction product (i.e. crude hydroxypropyl methyl cellulose). Next, water of 95° C. was added to the crude hydroxypropyl methyl cellulose in such an amount that a weight ratio of the water to the crude hydroxypropyl methyl cellulose was 20 to disperse the crude hydroxypropyl methyl cellulose, and then filtered to obtain a washed cake. Water of 95° C. was added to the washed cake in such an amount that a weight ratio of the water to the hydroxypropyl methyl cellulose was 10, and then filtered to obtain a hydroxypropyl methyl cellulose having a water content of 35% by weight and a temperature of 90° C.

The obtained hydroxypropyl methyl cellulose was then continuously fed into the inlet of a Proshear mixer equipped with a spray nozzle, having a stirring propeller rotated at a peripheral speed of 1.5 m/s and a jacket temperature of 90° C., at a rate of 1.00 part by weight of dry portion of the hydroxypropyl methyl cellulose per hour. Simultaneously, water of 90° C. was continuously sprayed from the spray nozzle at a feed rate of 0.684 parts by weight per hour. The contact product was mixed for 5 minutes and then continuously discharged. The discharged water-containing hydroxypropyl methyl cellulose had a water content of 55% by weight and a temperature of 87° C. Successively, the water-containing hydroxypropyl methyl cellulose was continuously fed for cooling to a continuous type Proshear mixer equipped with a jacket, having a stirring propeller rotated at a peripheral speed of 1.5 m/s and a jacket temperature of 30° C. The mixture was cooled for 5 minutes and then continuously discharged. The discharged water-containing hydroxypropyl methyl cellulose had a temperature of 40° C. Successively, the water-containing hydroxypropyl methyl cellulose was simultaneously dried and pulverized in an impact pulverizer in which hot air of 150° C. was blown.

The measurement results of the water content, the substitution degrees, the viscosity at 20° C. of a 2% by weight aqueous solution, the average particle size, and the loose bulk density of the obtained hydroxypropyl methyl cellulose powder are shown in Table 1.

Comparative Example 1

Hydroxypropyl methyl cellulose powder was obtained in the same manner as in Example 1 except that water of 60° C. was sprayed from the spray nozzle. The water-containing hydroxypropyl methyl cellulose discharged from the Proshear mixer equipped with a spray nozzle had a water content of 55% by weight and a temperature of 78° C., and the cooled water-containing hydroxypropyl methyl cellulose discharged from the continuous type Proshear mixer equipped with a jacket had a temperature of 37° C. The results are shown in Table 1.

Example 2

Hydroxypropyl methyl cellulose having a water content of 45% by weight and a temperature of 90° C. was obtained in the same manner as in Example 1 except that 2.14 parts by weight of a 49% by weight aqueous sodium hydroxide solution, 1.46 parts by weight of methyl chloride, and 0.27 part by weight of propylene oxide were used relative to 1.00 part by weight of pulp powder.

The obtained hydroxypropyl methyl cellulose was then continuously fed into the inlet of a biaxial kneader equipped with a spray nozzle, having a stirring propeller rotated at a peripheral speed of 0.1 m/s and a kneader surface covered with a heat insulating material, at a feed rate of 1.00 part by weight of dry portion of the hydroxypropyl methyl cellulose per hour. Simultaneously, water of 80° C. was sprayed from the spray nozzle at a rate of 1.04 parts by weight per hour. The contact product was mixed for 30 minutes and then continuously discharged. The discharged water-containing hydroxypropyl methyl cellulose had a water content of 65% by weight and a temperature of 83° C. Successively, the water-containing hydroxypropyl methyl cellulose was continuously fed for cooling to a biaxial kneader equipped with a jacket, having a stirring propeller rotated at a peripheral speed of 0.1 m/s and a jacket temperature of 20° C. The mixture was cooled for 30 minutes and then continuously discharged. The discharged water-containing hydroxypropyl methyl cellulose had a temperature of 30° C. Successively, the water-containing hydroxypropyl methyl cellulose was simultaneously dried and pulverized in an impact pulverizer in which hot air of 150° C. was blown.

The measurement results of the water content, the substitution degrees, the viscosity at 20° C. of a 2% by weight aqueous solution, the average particle size, and the loose bulk density of the obtained hydroxypropyl methyl cellulose powder are shown in Table 1.

Comparative Example 2

Hydroxypropyl methyl cellulose powder was obtained in the same manner as in Example 2 except that water of 60° C. was sprayed from the spray nozzle. The water-containing hydroxypropyl methyl cellulose discharged from the biaxial kneader equipped with a spray nozzle had a water content of 65% by weight and a temperature of 76° C., and the cooled water-containing hydroxypropyl methyl cellulose discharged from the biaxial kneader equipped with a jacket had a temperature of 28° C. The results are shown in Table 1.

Example 3

Methyl cellulose having a water content of 60% by weight and a temperature of 90° C. was obtained in the same manner as in Example 1 except that 2.14 parts by weight of a 49% by weight aqueous sodium hydroxide solution and 1.46 parts by weight of methyl chloride were added relative to 1.00 part by weight of pulp power and no propylene oxide was added.

The obtained methyl cellulose was then continuously fed into the inlet of a Proshear mixer equipped with a spray nozzle, having a stirring propeller rotated at a peripheral speed of 5 m/s and a jacket temperature of 90° C., at a feed rate of 1.00 part by weight of dry portion of the methyl cellulose of per hour. Simultaneously, water of 70° C. was continuously sprayed from the spray nozzle at a rate of 2.500 parts by weight per hour. The contact product was mixed for 1 minute and then continuously discharged. The discharged water-containing methyl cellulose had a water content of 80% by weight and a temperature of 77° C. Successively, the water-containing methyl cellulose was continuously fed for cooling to a continuous type Proshear mixer equipped with a jacket, having a stirring propeller rotated at a peripheral speed of 5 m/s and a jacket temperature of −10° C. The mixture was cooled for 1 minute and then continuously discharged. The discharged water-containing methyl cellulose had a temperature of 10° C. Successively, the water-containing methyl cellulose was simultaneously dried and pulverized in an impact pulverizer in which hot air of 150° C. was blown.

The measurement results of the water content, the substitution degree, the viscosity at 20° C. of a 2% by weight aqueous solution, the average particle sizer, and the loose bulk density of the obtained methyl cellulose powder are shown in Table 1.

Comparative Example 3

Methyl cellulose powder was obtained in the same manner as in Example 3 except that water of 60° C. was sprayed from the spray nozzle. The water-containing methyl cellulose discharged from the Proshear mixer equipped with a spray nozzle had a water content of 80% by weight and a temperature of 72° C., and the cooled water-containing methyl cellulose discharged from the continuous type Proshear mixer equipped with a jacket had a temperature of 9° C. The results are shown in Table 1.

Example 4

Methyl cellulose having a water content of 60% by weight and a temperature of 90° C. was obtained in the same manner as in Example 3.

The obtained methyl cellulose was then continuously fed into the inlet of a Proshear mixer equipped with a spray nozzle, having a stirring propeller rotated at a peripheral speed of 20 m/s and a jacket temperature of 70° C., at a feed rate of 1.00 part by weight of dry portion of the methyl cellulose per hour. Simultaneously, water of 70° C. was continuously sprayed from the spray nozzle at a rate of 0.357 parts by weight per hour. The contact product was mixed for 1 minute and then continuously discharged. The discharged water-containing methyl cellulose had a water content of 65% by weight and a temperature of 85° C. Successively, the water-containing methyl cellulose was continuously fed for cooling to a continuous type Proshear mixer equipped with a jacket, having a stirring propeller rotated at a peripheral speed of 20 m/s and a jacket temperature of −10° C. The mixture was cooled for 1 minute and then continuously discharged. The discharged water-containing methyl cellulose had a temperature of 11° C. Successively, the water-containing methyl cellulose was simultaneously dried and pulverized in an impact pulverizer in which hot air of 150° C. was blown.

The measurement results of the water content, the substitution degree, the viscosity at 20° C. of a 2% by weight aqueous solution, the average particle size, and the loose bulk density of the obtained methyl cellulose powder are shown in Table 1.

Comparative Example 4

Methyl cellulose powder was obtained in the same manner as in Example 4 except that water of 60° C. was sprayed from the spray nozzle. The water-containing methyl cellulose discharged from the Proshear mixer equipped with a spray nozzle had a water content of 65% by weight and a temperature of 83° C., and the cooled water-containing methyl cellulose discharged from the continuous type Proshear mixer equipped with a jacket had a temperature of 11° C. The results are shown in Table 1.

Example 5

Methyl cellulose having a water content of 60% by weight and a temperature of 90° C. was obtained in the same manner as in Example 3.

The obtained methyl cellulose was then continuously fed into the inlet of the first zone of Proshear mixer having the first half zone and the second half zone at a rate of 1.00 part by weight of dry portion of the hydroxypropyl methyl cellulose per hour. The Proshear mixer had a stirring propeller rotated at a peripheral speed of 5 m/s in both the first and second half zones, a jacket temperature of the first half zone differing from the jacket temperature of the second half zone, and a spray nozzle located in the first half zone. Simultaneously, water of 70° C. was continuously sprayed from the spray nozzle at a rate of 2.500 parts by weight per hour. The jacket temperature of the first half zone was 70° C., while the jacket temperature of the second half zone was −5° C. The mixing time in the first half zone was 3 minutes, while the cooling time in the second half zone was 5 minutes. The cooled water-containing hydroxypropyl methyl cellulose discharged continuously had a water content of 80% by weight and a temperature of 10° C. Successively, the water-containing hydroxypropyl methyl cellulose was simultaneously dried and pulverized in an impact pulverizer in which hot air of 150° C. was blown.

The measurement results of the water content, the substitution degree, the viscosity at 20° C. of a 2% by weight aqueous solution, the average particle size, and the loose bulk density of the obtained methyl cellulose powder are shown in Table 1.

Example 6

Water-containing hydroxypropyl methyl cellulose having a water content of 55% by weight and a temperature of 87° C. was obtained in the same manner as in Example 1, and then cooled in the same manner as in Example 1 to obtain water-containing hydroxypropyl methyl cellulose having a temperature of 40° C. Then the water-containing hydroxypropyl methyl cellulose was dried by using a paddle dryer having a jacket temperature of 140° C. until the water content thereof reached 1% by weight. The dried hydroxypropyl methyl cellulose was pulverized with a ball mill and passed through a sieve having openings of 250 µm.

The measurement results of the water content, the substitution degree, the viscosity at 20° C. of a 2% by weight aqueous solution, the average particle size, and the loose bulk density of the obtained hydroxypropyl methyl cellulose powder are shown in Table 1.

Comparative Example 5

Hydroxypropyl methyl cellulose powder was obtained in the same manner as in Example 6 except that water of 60° C. was sprayed from the spray nozzle. The water-containing hydroxypropyl methyl cellulose discharged from the Proshear mixer equipped with a spray nozzle had a water content of 55% by weight and a temperature of 78° C., and the cooled water-containing hydroxypropyl methyl cellulose discharged from the continuous type Proshear mixer equipped with a jacket had a temperature of 37° C. The results are shown in Table 1.

TABLE 1

| | temp. of water to be mixed (° C.) | water cont. of cellulose ether before mixed with water (wt %) | water cont. of cellulose ether after mixed with water (wt %) | diff. in water content between before and after mixed (wt %) | temp. of cooled water-containing cellulose ether (° C.) | Water Content (wt %) | substitution degree of methoxy (%) | molar substitution of hydroxy-propoxy (%) | viscosity at 20° C. of 2 wt % aqueous solution (mPa · s) | average particle size (μm) | loose bulk density (g/ml) |
|---|---|---|---|---|---|---|---|---|---|---|---|
| Example 1 | 90 | 35 | 55 | 20 | 40 | 1 | 23.9 | 8.8 | 100000 | 60 | 0.41 |
| Comp. Ex. 1 | 60 | 35 | 55 | 20 | 37 | 1 | 23.9 | 8.8 | 100000 | 60 | 0.26 |
| Example 2 | 80 | 45 | 65 | 20 | 30 | 1 | 27.8 | 6.5 | 98000 | 60 | 0.43 |
| Comp. Ex. 2 | 60 | 45 | 65 | 20 | 28 | 1 | 27.8 | 6.5 | 98000 | 60 | 0.27 |
| Example 3 | 70 | 60 | 80 | 20 | 10 | 1 | 30.3 | — | 99000 | 60 | 0.46 |
| Comp. Ex. 3 | 60 | 60 | 80 | 20 | 9 | 1 | 30.3 | — | 99000 | 60 | 0.29 |
| Example 4 | 70 | 60 | 65 | 5 | 11 | 1 | 30.3 | — | 99000 | 60 | 0.43 |
| Comp. Ex. 4 | 60 | 60 | 65 | 5 | 11 | 1 | 30.3 | — | 99000 | 60 | 0.26 |
| Example 5 | 70 | 60 | 80 | 20 | 10 | 1 | 30.3 | — | 99000 | 60 | 0.45 |
| Example 6 | 90 | 35 | 55 | 20 | 40 | 1 | 23.9 | 8.8 | 50000 | 60 | 0.35 |
| Comp. Ex. 5 | 60 | 35 | 55 | 20 | 40 | 1 | 23.9 | 8.8 | 50000 | 60 | 0.25 |

As shown in Table 1, the water-containing hydroxypropyl methyl cellulose products obtained by mixing hydroxypropyl methyl cellulose with water of 90° C. in Examples 1 and 6 and with water of 80° C. in Example 2, and the water-containing methyl cellulose products obtained by mixing methyl cellulose with water of 70° C. in Examples 3-5 resulted in hydroxypropyl methyl cellulose powder and methyl cellulose having higher loose bulk densities, as compared with the water-containing hydroxypropyl methyl cellulose products obtained by mixing hydroxypropyl methyl cellulose with water of 60° C. in Comparative Examples 1-2 and 5 and the water-containing methyl cellulose products obtained by mixing methyl cellulose with water of 60° C. in Comparative Examples 3-4.

The invention claimed is:

1. A method for producing a water-soluble nonionic cellulose ether powder, comprising the steps of:
   reacting alkali cellulose with an etherifying agent to obtain a reaction product;
   washing and draining the reaction product to obtain a water-soluble nonionic cellulose ether having a water content of 30 to 60% by weight;
   mixing the water-soluble nonionic cellulose ether in a mixer with a stirrer at a temperature of 70 to 100° C. with such an amount of water of 70° C. or higher as to increase the water content by at least 5% and make the water content of the water-soluble nonionic cellulose ether become 55 to 90% by weight to obtain a water-containing water-soluble nonionic cellulose ether having a water content of 55 to 90% by weight;
   cooling the water-containing water-soluble nonionic cellulose ether; and
   drying and pulverizing the cooled water-containing water-soluble nonionic cellulose ether having a loose bulk density between 0.20 to 0.60 g/ml.

2. The method for producing a water-soluble nonionic cellulose ether powder according to claim 1, wherein the step of mixing the water-soluble nonionic cellulose ether at a temperature of 70 to 100° C. with the water comprises simultaneous contact between the water-soluble nonionic cellulose ether and the water of 70° C. or higher and stirring in a mixer with a stirrer.

3. The method for producing a water-soluble nonionic cellulose ether powder according to claim 1 wherein the step of cooling comprises cooling the water-containing water-soluble nonionic cellulose ether to 0 to 40° C.

4. The method for producing a water-soluble nonionic cellulose ether powder according to claim 1, wherein the step of cooling the water-containing water-soluble nonionic cellulose ether comprises bringing the water-containing water-soluble nonionic cellulose ether into contact with a cooled heat transfer surface, bringing the water-containing water-soluble nonionic cellulose ether into contact with cold air, or using vaporization heat to cool the water-containing water-soluble nonionic cellulose ether.

* * * * *